United States Patent [19]
Gunjima et al.

[11] Patent Number: 5,386,306
[45] Date of Patent: Jan. 31, 1995

[54] ACTIVE MATRIX LIQUID CRYSTAL DISPLAY ELEMENT AND PROJECTION TYPE ACTIVE MATRIX LIQUID CRYSTAL DISPLAY DEVICE

[75] Inventors: Tomoki Gunjima, Yokohama; Masanori Yuki, Hatano; Masaya Kunigita; Yoshinori Hirai, both of Yokohama; Yukio Yoshikawa, Kawasaki; Eiji Shidoji, Yokohama, all of Japan

[73] Assignee: Asahi Glass Company Ltd., Tokyo, Japan

[21] Appl. No.: 886,946

[22] Filed: May 22, 1992

Related U.S. Application Data

[63] Continuation of Ser. No. 413,072, Sep. 27, 1989, Pat. No. 5,150,232.

[30] Foreign Application Priority Data

Oct. 4, 1988 [JP] Japan .................. 63-249020
Jul. 27, 1989 [JP] Japan .................. 1-192760

[51] Int. Cl.⁶ .................................................. G02F 1/13
[52] U.S. Cl. ................................... 359/52; 359/45; 359/94; 359/106
[58] Field of Search ................. 359/51, 52, 45, 94, 359/106

[56] References Cited

U.S. PATENT DOCUMENTS

| | | | |
|---|---|---|---|
| 4,435,047 | 3/1984 | Fergason | 359/52 |
| 4,662,720 | 5/1987 | Fergason | 350/333 |
| 4,678,181 | 7/1987 | Yaniv et al. | 350/333 |
| 4,818,070 | 4/1989 | Gunjima et al. | 359/93 |
| 4,834,509 | 5/1989 | Gunjima et al. | 359/52 |

FOREIGN PATENT DOCUMENTS 8505192 11/1985 WIPO .

Primary Examiner—Sara W. Crane
Attorney, Agent, or Firm—Oblon, Spivak, McClelland, Maier & Neustadt

[57] ABSTRACT

An active matrix liquid crystal display element and a projection type active matrix liquid crystal display device by which a display can be obtained which is good in color balance and high in brightness and also in contrast ratio. The display element includes a liquid crystal material held between an active matrix substrate and a counter electrode substrate. The liquid crystal material is formed from a liquid crystal polymer composite wherein nematic liquid crystal is contained dispersively in a polymer matrix having a refractive index which coincides with the ordinary refractive index of the liquid crystal used, and a silicon thin film transistor is used as an active element on the active matrix substrate. The display device includes such an active matrix liquid crystal display element, a light source for projection light, and an optical system of projection.

13 Claims, 2 Drawing Sheets

ACTIVE MATRIX LIQUID CRYSTAL DISPLAY ELEMENT AND PROJECTION TYPE ACTIVE MATRIX LIQUID CRYSTAL DISPLAY DEVICE

This is a continuation of application Ser. No. 07/413,072, filed on Sep. 27, 1989, now U.S. Pat. No. 5,150,232.

This invention relates to a projection type active matrix liquid crystal display device.

In recent years, liquid-crystal display devices are widely used with personal word processors, hand-held computers, pocket TV sets and so forth taking advantage of their characteristics of low power consumption, low driving voltage and so forth. Above all, particular attention is paid to and great efforts are made to develop active matrix liquid crystal display elements wherein an active element is disposed for each pixel electrode.

A liquid crystal display element which employs liquid crystal of the DSM (Dynamic Scattering Mode) type was initially proposed as one of such liquid crystal display elements. However, a liquid crystal display element of the DSM type has a drawback that power consumption is high since the value of electric current flow through liquid crystal thereof is large. Accordingly, liquid crystal display elements prevail at present which employs liquid crystal of the TN (twisted nematic) type, and such liquid crystal display elements are employed in pocket TV sets on the market. Since liquid crystal of the TN type is very low in leak current and hence in power consumption, it is suitable for applications which employ a battery as a power source.

When an active matrix liquid crystal display element is used in the dynamic scattering mode, the leak current of liquid crystal itself is large. Accordingly, it has drawbacks that a large storage capacitor must be provided in parallel to each pixel and that the power consumption of the lqiuid crystal display element itself is large.

In the TN mode, large storage capacitor need not be added and the power consumption of the lqiuid crystal display element itself can be reduced because the leak current of the liquid crystal itself is very small.

However, since two polarizing plates are required in the TN mode, there is a problem that the light transmittance through the cell is low in on and off state.

Particularly when a picture image is to be projected, a very intense light source is required, and there are problems that a high contrast cannot be obtained on a projection screen and that heat generated by the light source may have a bad influence on the liquid crystal display element.

A mode has thus been proposed wherein the light scattering transmission characteristic of a liquid crystal polymer composite composed of nematic liquid crystal dispersively contained in a polymer matrix is used in order to solve the subjects of the TN mode.

However, the proposed mode still has problems that a sufficient brightness or a sufficient contrast ratio can not be obtained with a low voltage and that a color balance can not be gained readily.

The present invention has been made to solve the subjects described above and to provide an active matrix liquid crystal display element of the type wherein a liquid crystal material is held between an active matrix substrate on which an active element is provided for each pixel electrode and a counter electrode substrate on which a counter electrode is provided, characterized in that the liquid crystal material is formed from a liquid crystal polymer composite wherein nematic liquid crystal is contained dispersively in a polymer matrix having a refractive index which coincides with the ordinary refractive index ($n_o$) of the liquid crystal used, and a polysilicon thin film transistor is used as the active element.

The present invention further provides a projection type active matrix liquid crystal display device of the type which includes an active matrix liquid crystal display element wherein a liquid crystal material held between an active matrix substrate on which an active element is provided for each pixel electrode and a counter electrode substrate on which a counter electrode is provided, a light source for projection light, and an optical system of projection; characterized in that the liquid crystal material is formed from a liquid crystal polymer composite wherein nematic liquid crystal is contained dispersively in a polymer matrix having a refractive index which coincides with the ordinary refractive index ($n_o$) of the liquid crystal used, and a polysilicon thin film transistor is used as the active element.

The present invention also provides a projection type active matrix liquid crystal display device of the type which includes an active matrix liquid crystal display element wherein a liquid crystal polymer composite composed of nematic liquid crystal dispersively contained in a polymer matrix having a refractive index which is substantially equal to the ordinary refractive index ($n_o$) of the liquid crystal used is held between an active matrix substrate on which an active element is provided for each pixel electrode and a counter electrode substrate on which a counter electrode is provided, a light source for projection light, and an optical system of projection, characterized in that the anisotropy of refractive index $\Delta n$ of the nematic liquid crystal used is greater than 0.18, and the average particle diameter $R(\mu m)$ of the liquid crystal dispersively contained in the polymer matrix and the distance $d(\mu m)$ between the active matrix substrate and the counter electrode substrate satisfy the relationships of $$0.3 < R \cdot \Delta n < 0.7 \tag{1}$$

$$4R < d < 8R \tag{2}$$

The present invention further provides a projection type active matrix liquid crystal display device which includes an active matrix liquid crystal display element wherein a liquid crystal material is held between an active matrix substrate on which an active element is provided for each pixel electrode and a counter electrode substrate on which a counter electrode is provided, a light source for projection light, and an optical system of projection, characterized in that the liquid crystal material used is a liquid crystal polymer composite wherein nematic liquid crystal is dispersively contained in a polymer matrix having a refractive index which coincides with the ordinary refractive index ($n_o$) of the liquid crystal used, and the anisotropy of refractive index $\Delta n$ of the nematic liquid crystal used is greater than 0.18 while the average particle diameter $R(\mu m)$ of the liquid crystal dispersively contained in the polymer matrix and the distance $d(\mu m)$ between the active matrix substrate and the counter electrode substrate satisfy the relationships of $$0.3 < R \cdot \Delta n < 0.7 \tag{1}$$

$$4R < d < 8R \tag{2}$$

The present invention further provides a projection type active matrix liquid crystal display device of the type which includes a plurality of colored light sources, a plurality of active matrix liquid crystal display elements for individually receiving light from the colored light sources, and an optical system of projection for combining light emerging from the active matrix liquid crystal display elements and projecting the thus combined light, characterized in that each of the active matrix liquid crystal display elements is constituted such that nematic liquid crystal is dispersively contained in a polymer matrix between an active matrix substrate on which an active element is provided for each pixel electrode and a counter electrode substrate on which a counter electrode is provided, and the refractive indices of the polymer matrices substantially coincide with the ordinary refractive indices ($n_o$) of the liquid crystal used and the anisotropies of refractive index $\Delta n$ of the liquid crystal used are greater than 0.18 while the average particle diameters $R_x(\mu m)$ of the liquid crystal of the individual colors dispersively contained in the polymer matrices, the distances $d_x(\mu m)$ between the active matrix substrates and the opposing electrodes and the dominant wavelengths $\lambda_x$ of the colors of the individual light sources have the following relationship to the average particle diameter $R_G(\mu m)$ and the electrode distance $d_G(\mu m)$ where the dominant wavelength $\lambda_x$ of the light source of green is $\lambda_G = 540$ nm.

$$0.3 < R_G \cdot \Delta n < 0.7 \tag{1A}$$
$$4 R_G < d_G < 8 R_G \tag{2A}$$

$$\frac{0.9 R_G}{\lambda_G} < \frac{R_x}{\lambda_x} < \frac{1.1 R_G}{\lambda_G} \tag{4}$$

$$\frac{0.9 d_G}{\lambda_G} < \frac{d_x}{\lambda_x} < \frac{1.1 d_G}{\lambda_G} \tag{5}$$

The present invention further provides a projection type active matrix liquid crystal display device of the type which includes a plurality of colored light sources, a plurality of active matrix liquid crystal display elements for individually receiving light from the colored light sources, and an optical system of projection for combining light emerging from the active matrix liquid crystal display elements and projecting the thus combined light, characterized in that each of the active matrix liquid crystal display elements is constituted such that nematic liquid crystal having a positive dielectric anisotropy is dispersively contained in a polymer matrix between an active matrix substrate on which an active element is provided for each pixel electrode and a counter electrode substrate on which a counter electrode is provided, and the refractive index of the polymer matrix substantially coincides with the ordinary refractive index ($n_o$) of the liquid crystal used and the anisotropy of refractive index $\Delta n$ of the liquid crystal used is greater than 0.18 while the average particle diameters $R(\mu m)$ of the liquid crystals of the individual colors dispersively contained in the polymer matrices, the electrode distances $d_x(\mu m)$ for the individual colors and the dominant wavelengths $\lambda_x$ of the colors of the individual light sources have the following relationship to the electrode distance $d_G(\mu m)$ where the dominant wavelength $\lambda_G$ of the light source of green is $\lambda_G = 540$ nm.

$$0.3 < R \cdot \Delta n < 0.7 \tag{1}$$
$$4 R < d_G < 8 R \tag{2}$$

$$\frac{0.95 d_G}{\sqrt{\lambda_G}} < \frac{d_x}{\sqrt{\lambda_x}} < \frac{1.05 d_G}{\sqrt{\lambda_G}} \tag{5A}$$

The present invention further provides an active matrix liquid crystal display element of the type which includes a plurality of color filters disposed therein, characterized in that nematic liquid crystal having a positive dielectric anisotropy is dispersively contained in a polymer matrix between an active matrix substrate on which an active element is provided for each pixel electrode and a counter electrode substrate on which a counter electrode is provided, and the refractive index of the polymer matrix substantially coincides with the ordinary refractive index ($n_o$) of the liquid crystal used and the anisotropy of refractive index $\Delta n$ of the liquid crystal used is greater than 0.18 while the average particle diameters $R(\mu m)$ and the electrode distances $d_x(\mu m)$ of the liquid crystal of the individual colors dispersively contained in the polymer matrix and the dominant wavelengths $\lambda_x$ of transmission light through the individual color filters have the following relationships to the electrode distance $d_G(\mu m)$ where the dominant wavelength $\lambda_G$ of the light source of green is $\lambda_G = 540$ nm.

$$0.3 < R \cdot \Delta n < 0.7 \tag{1}$$
$$4 R < d_G < 8 R \tag{2}$$

$$\frac{0.95 d_G}{\sqrt{\lambda_G}} < \frac{d_x}{\sqrt{\lambda_x}} < \frac{1.05 d_G}{\sqrt{\lambda_G}} \tag{5A}$$

The present invention additionally provides a projection type active matrix liquid crystal display device of the type which includes a projection light source, an active matrix liquid crystal display element having a plurality of color filters disposed thereon, and an optical system of projection for projecting light emerging from the active matrix liquid crystal display element, characterized in that the active matrix liquid crystal display element is composed of nematic liquid crystal having a positive dielectric anisotropy and dispersively contained in a polymer matrix between an active matrix substrate on which an active element is provided for each pixel electrode and a counter electrode substrate on which a counter electrode is provided, and the refractive index of the polymer matrix substantially coincides with the ordinary refractive index ($n_o$) of liquid crystal used and the anisotropy of refractive index $\Delta n$ of the liquid crystal used is greater than 0.18 while the average particle diameter $R(\mu m)$, the electrode distances $d_x(\mu m)$ of the liquid crystals of the individual colors dispersively contained in the polymer matrix and the dominant wavelength $\lambda_x$ of transmission light through the individual color filters have the following relationship to the electrode distance $d_G$ where the dominant wavelength $\lambda_G$ of the light source of green is $\lambda_G = 540$ nm.

$$0.3 < R \cdot \Delta n < 0.7 \tag{1}$$
$$4 R < d_G < 8 R \tag{2}$$

$$\frac{0.95\, d_G}{\sqrt{\lambda_G}} < \frac{d_x}{\sqrt{\lambda_x}} < \frac{1.05\, d_G}{\sqrt{\lambda_G}} \qquad (5A)$$

In a projection type active matrix liquid crystal display device of the present invention, since an active matrix liquid crystal display element is used wherein a liquid crystal material to be held between an active matrix substrate and a counter electrode substrate is a liquid crystal polymer composite which can be electrically controlled between a scattering condition and a transmitting (transparent) condition, no polarizing plate is required, and the transmittance of light upon transmitting condition can be improved significantly. Further, since the average particle diameter R(μm) and the electrode distance d(μm) of the liquid crystal polymer composite are set individually, when colors are mixed upon projection display, a display of a high contrast ratio can be obtained. Particularly where the average particle diameters $R_x$(μm) and the electrode distances $d_x$(μm) of the liquid crystal polymer composite are set for individual colors, when colors are mixed upon projection display, a display can be obtained which is good in color balance and high in brightness and also in contrast ratio.

Further, since possible problems of destruction of active elements upon an orientation processing necessary for a liquid crystal display element of the TN type or by static electricity generated inadvertently can be avoided, the yield in production of liquid crystal display elements can be improved significantly.

Moreover, since the liquid crystal polymer composite presents the form of a film after curing thereof, such problems as short-circuiting between substrates by pressure thereupon and destruction of active elements by displacement of a spacer do not take place easily.

Meanwhile, the liquid crystal polymer composite is similar in specific resistance to that in the conventional TN mode, and a great storage capacitor need not be provided for each pixel element as in the DS mode. Consequently, designing of active elements can be facilitated and power consumption of liquid crystal display elements can be restricted to a low level. Accordingly, liquid crystal display elements can be produced by a conventional process of production of liquid crystal display elements of the TN mode without an orientation process of liquid crystal, and accordingly, production of them is easy. The specific resistance of the liquid crystal polymer composite is preferably higher than $5 \times 10^9$ Ωcm. Further, in order to minimize the voltage drop by a leak current and so forth, the specific resistance should preferably be higher than $10^{10}$ Ωcm, and in this instance, there is no necessity of provision of a large storage capacitor for each pixel electrode.

An active element provided for each pixel element may be a transistor, a diode, a non-linear resistor element or the like, and where it is necessary, two or more active elements may be disposed for each pixel. The liquid crystal polymer composite described above is held between an active matrix substrate on which such active elements and pixel electrodes connected to the active elements are provided and a counter electrode substrate on which a counter electrode is provided to make a liquid crystal display element. In the present invention, it is preferable to use a polysilicon thin film transistor (p-Si TFT) as such an active element. This is becasue, where the liquid crystal element is used with a projection type display device, even if light is received from an intense projection light source, the TFT will not be influenced by the light to cause an operation in error and the display device will not make an error display frequently.

Moreover, in the present invention, an amorphous silicon TFT (a-Si TFT) also may be used as such an active element with a light shielding layer. In the case of using a-Si TFT, it is necessary to provide a light shielding layer in order to reduce the operational error of TFT caused by the light from the projection light source.

While a projection type active matrix liquid crystal display device of the present invetion may include a single projection light source and single optical system of projection, it is preferable to use a plurality of colored light sources and optial systems of projection where a plurality of liquid display elements are used to make a multi-color display. A conventionally known projection light source and optical system of projection such as a lens can be employed for such light source and optical system of projection, respectively, and where a plurality of liquid crystal display elements are used to make a multi-color display, the liquid crystal display elements may be disposed corresponding to the individual colored light sources such that images therefrom may be combined for projection.

Such colored light sources may be light sources for individual colors or may be obtained by separation of light from a single light source. Beams of light emerging from the colored light sources are introduced into an active matrix liquid crystal display element or elements. According to the present invention, a plurality of active matrix liquid crystal display elements are used in accordance with their characteristics of the individual colors. Beams of light emerging from the active matrix liquid crystal display elements are mixed and then projected. Consequently, a projection image can be obtained which is bright, good in color balance and high in contrast ratio.

According to the present invention, a liquid crystal polymer composite is used which is composed of a polymer matrix having a large number of fine holes or pores formed therein and nematic liquid crystal filled in the holes of the polymer matrix, the refractive index of the polymer matrix being substantially equal to the ordinary refractive index ($n_o$) of the liquid crystal used, the anisotropy of refractive index Δn of the liquid crystal being greater than 0.18. The liquid crystal polymer composite is held between an active matrix substrate and a counter electrode substrate to make a liquid crystal display element. The refractive index of the liquid crystal varies in response to an applied condition of a voltage between the electrodes of the liquid crystal display element, and thereupon, the relationship between the refractive index of the polymer matrix and the refractive index of the liquid crystal varies. When the refractive indices of them coincide with each other, the liquid crystal display element presents a transmitting condition, but the refractive indices are different for each other, the liquid crystal dislpaly element presents a scattering condition.

The liquid crystal polymer composite composed of the polymer matrix having a large number of fine holes formed therein and the liquid crystal filled in the holes of the polymer matrix has such a structure that the liquid crystal is enclosed in vacuoles similar to micro-capsules, but the individual micro-capsules need not be completely independent of each other and individual vacuoles of the liquid crystal may be combined with each other like a porous substance.

The liquid crystal polymer composite for use with a liquid crystal display element of the present invention may be produced such that nematic liquid crystal material and a prepolymer for constituting a polymer matrix are mixed with each other into the condition of solution or latex, which is then caused to cure by light or heat or by removal of solvent or else by a reaction to separate the polymer matrix so as to reach a condition wherein the nematic liquid crystal is dispersed in the polymer matrix.

Preferably, the polymer used is of the light curable type or of the heat curable type so that it can be cured in an enclosed system.

Particularly a polymer of the light curable type is preferable because it is little influenced by heat and can be cured in a short period of time.

According to an exemplary process of production of a liquid crystal polymer composite, a cell is formed using a seal material similarly as in the case of conventional ordinary nematic liquid crystal, and a non-cured mixture of nematic liquid crystal and a material for constituting a polymer matrix is filled into the cell by way of a filling port, whereafter the filling port is closed an either light is irradiated upon the mixture or the mixture is heated to cure the mixture.

Meanwhile, in the case of a liquid crystal display element of the present invention, a liquid crystal resin compound material can be produced without using a seal material. For example, a non-cured mixture of nematic liquid crystal and a polymer matrix may be supplied onto a substrate on which a transparent electrode is provided as a counter electrode, whereafter an active matrix substrate on which an active element is provided for each pixel electrode is placed or the opposing electrode substrate and then light is irraidated upon the mixture to cure the mixture.

Naturally, a seal material may be applied on a periphery of the liquied crystal resin compound material to seal the latter after then. According to the process, since a non-cured mixture of nematic liquid crystal and a polymer matrix must only be supplied by roll coating, spin coating, printing, application by means of a dispenser or the like, the filling step is simple and the productivity is high.

Further, a spacer for controlling the distance between substrates such as ceramic particles, plastic particles, a glass fiber, a pigment, a coloring matter, a viscosity controlling agent or any other additive which does not have a bad influence on performances of a liquid crystal display element of the present invention.

If a sufficiently high voltage is applied to a particular portion of the liquid crystal display element during a curing step, then the portion of the liquid crystal display element becomes transparent in on and off state (a normally transmitting condition). Accordingly, when it is intended to provide a fixed indication, such a normally transmitting portion may be formed in the liquid crystal display element.

The response time of a liquid crystal display element of the present invention which employs such a liquid crystal polymer composite as described above is 3 to 50 msec or so as a rising time upon application of a voltage and 10 to 80 msec as a falling time upon removal of the voltage and is thus quicker than a conventional liquid crystal displayselement of the TN mode.

Further, the electro-optical characteristics of voltage-transmittance dependency of the liquid crystal display element is looser than a conventional liquid crystal display element of the TN mode, therefore driving of the liquid crystal display element to indicate gray scale is very easy.

It is to be noted that desirably the transmittance of the liquid crystal display element which employs the liquid crystal polymer composite is as high as possible in transmitting condition, and preferably the haze value in a scattering condition is higher than 80%.

According to the present invention, when a voltage is applied across the liquid crystal display element, the refractive index of the polymer matrix (after it has been cured) coincides with the ordinary refractive index ($n_o$) of the liquid crystal used.

Consequently, when the refractive index of the resin matrix and the refractive index of the liquid crystal coincide with each other, light is transmitted through the liquid crystal display element, but when they do not coincide with each other, light will be scattered (the liquid crystal display element will become slightly opaque). The light scattering property of the element is higher than a conventional liquid crystal display element in the DS mode (Dynamic Scattering Mode), and a display of a high contrast ratio can be attained.

The object of the present invention is the provision of an optimum construction for a projection type active matrix liquid crystal display device which employs an active matrix liquid crystal display element in which a liquid crystal polymer composite is held.

In particular, the present invention provides a projection type active matrix liquid crystal display device which has a high transmittance in a trasmitting condition but has a high diffusing property (light interrupting property) in a scattering condition and is bright, good in color balance and high in contrast ratio, Futher, where a p-SiTFT is employed, even if light is received from an intense projection light source, the TFT will not react to the light so that the projection type active matrix liquid crystal display device will seldom make a display in error, and a brighter projection type display is enabled.

Factors which determine electro-optic characteristics of an active matrix liquid crystal display element which employs such a liquid crystal polymer composite as described above include refractive indices (ordinary refractive index $n_o$ and extraordinary refractive index $n_e$), relative dielectric constants ($\epsilon_{//}$ and $\epsilon\perp$, $//$ and $\perp$ denote parallelism and perpendicularity to a molecular axis of the liquid crystal, respectively), a viscosity and a modulus of elasticity of liquid crystal used, and a refractive index $n_p$, a relative dielectric constant $\epsilon_p$ and a modulus of elasticity of a polymer used as well as an average particle diameter R of the liquid crystal dispersively contained in the polymer matrix, a volume fraction of liquid crystal $\Phi$, a distance d between a pair of electrode plates (thickness of the liquid crystal polymer composite), a maximum root mean square of applied voltage V to be applied to a picture element portion of the liquid crystal polymer composite from an active element, and so forth. Here, the liquid crystal average particle diameter R denotes, when the liquid crystal presents the form of substantially spherical vacuoles, an average diameter of such spheres, but when the liquid crystal has a porous structure, an average diameter of regions in which directors of the liquid crystal are related to each other.

An active matrix liquid crystal display element which employs the liquid crystal polymer composite according to the present invention desirably has an electro-optic characteristic that it has a high light scattering property when no electric field is applied thereto but has a high transmittance when an electric field is applied thereto, that is, it has a high display contrast ratio. Where a display of the projection type is made using such a liquid crystal display element, a display can be obtained which is high in brightness and high in contrast ratio.

In order to obtain such a display, it is necessary for the factors listed above to have optimum relationships.

Particularly important ones of the factors which determine electro-optic characteristics of an active matrix liquid crystal display element are a refractive index (anisotropy of refractive index $\Delta n = $ extraordinary refractive index $n_e$-ordinary refractive index $n_o$) of liquid crystal used, an average particle diameter R of the liquid crystal and a distance d between a pair of electrode substrates. In the case of a multi-color display, an average particle diameter $R_x$ and an electrode substrate distance $d_x$ are determined for optimization for each liquid crystal display element in accordance with a dominant wavelength $\lambda_x$ of a colored light source.

The anisotropy of refractive index $\Delta n$ ($=n_e-n_o$) of liquid crystal used contributes to a light scattering property of a liquid crystals display element when no electric field is applied to the liquid crystal display element, and in order to obtain a high light scattering property, the anisotropy of refractive index $\Delta n$ preferably has a considerably large value, and particularly, a preferable condition is $\Delta n > 0.18$. Further, the ordinary refractive index $n_o$ of liquid crystal used preferably coincides with the refractive index $n_p$ of a polymer matrix and in this condition, a high transparency is obtained when an electric field is applied. Particularly, it is preferable for the ordinary refractive index $n_o$ to meet the relationship of $n_o - 0.03 < n_p < n_o + 0.05$.

The average particle diameter R of liquid crystal dispersively contained in a polymer matrix is a very important factor and contributes to a light scattering property when no electric field is applied and also to an operation characteristic of the liquid crystal when an electric field is applied. The light scattering property when no electric field is applied varies depending upon a relationship among the anisotropy of refractive index $\Delta n$ of liquid crystal used, the wavelength $\lambda$ of light and the average particle diameter R of the liquid crystal.

Therefore, in the case of an ordinary white and black display, the average particle diameter R(μm) and the electrode substrate distance d(μm) are set in the following manner:

$$0.3 < R \cdot \Delta n < 0.7 \qquad (1)$$

$$4R < d < 8R \qquad (2).$$

Further, in this instance, as the liquid crystal display element is driven such that the maximum root mean square of applied voltage V(V) to be applied to the liquid crystal polymer composite may satisfy the relationship of $$0.5R \cdot V < d < R \cdot V \qquad (3)$$

a display of a high contrast ratio can be made with a low voltage.

In case a display is to be made in a plurality of colors, the average particle diameter $R_x$ and the electrode substrate distance $d_x$ must necessarily be set for each liquid crystal display element in the following manner in order to maximize the light scattering property per unit operation liquid crystal amount in accordance with a dominant wavelength $\lambda_x$ of each light source.

It is to be noted that, where the dominant wavelength $\lambda_G$ of a light source of green is $\lambda_G = 540$ nm, the average particle diameter is denoted by $R_G$(μm) and the electrode substrate distance is denoted by $d_G$(μm).

$$0.3 < R_G \cdot \Delta n < 0.7 \qquad (1A)$$

$$4R_G < d_G < 8R_G \qquad (2A)$$

Particularly since the color of the light source is green, it is preferable to have a condition of $0.4 < R_G \cdot \Delta n < 0.6$, and in case $\Delta n = 0.25$ or so, $R_G$ is 2.0 μm or so. Further, it is preferable for $\Delta n$ to be greater than 0.2 in order to obtain a high light scattering property.

Where the average particle diameter $R_G$ of a liquid crystal display element with respect to the light source of green is smaller than the range defined by the equation (1A) above, the light scattering property has a wavelength dependency wherein it is higher on the short wavelength side, and since a higher electric field is required for operation of the lqiuid crystal, another problem takes place that power consumption increases. On the contrary, in case the average particle diameter $R_G$ is greater than the range of the equation (1A), the wavelength dependency of the light scattering property decreases but the light scattering property is low over the entire visible radiation region. Consequently, such problems take place that the contrast ratio is deteriorated and that the response time from a transmitting condition to a scattering condition becomes slow. As a result, the range defined as above is adopted.

Control of such average particle diameters may be obtained by control of a composition, a temperature upon curing, an irradiation intensity of light, an irradiation time and so forth, and conditions therefor may be determined experimentally.

Also an electrode substrate distance $d_G$ of a liquid crystal display element with repsect to a light source is an important factor. If $d_G$ is increased, then the light scattering property of the liquid crystal display element when no electric field is applied is improved. However, if $d_G$ is excessively high, then a high voltage is required in order to attain a sufficient transparency when an electric field is applied, which arises such problems that power consumption increases and that a conventional active element for the TN mode or conventional driving integrated circuit cannot be used. On the contrary, if $d_G$ is decreased, then a high transparency can be obtained with a low voltage, but the light scattering property when no electric field is applied decreases. Accordingly, the condition of the equation (2A) given hereinabove should be satisfied in order to meet the light scattering property when no electric field is applied and the high transparency when an electric field is applied.

On the other hand, in the case of a white and black display, the conditions of the equations (1) and (2) are adopted, and since the wavelength of green substantially falls on the center of the visible radiation region, it is best to satisfy the equations (1) and (2).

Further, in order to match characteristics for individual colors, $R_x/\lambda_x$ is substantially made equal to $R_G/\lambda_G$ and $d_x/\lambda_x$ is substantially made equal to $d_x/\lambda_x$ at all of liquid crystal display elements. Particularly, the following relationships are satisfied.

$$\frac{0.9\,R_G}{\lambda_G} < \frac{R_x}{\lambda_x} < \frac{1.1\,R_G}{\lambda_G} \quad (4)$$

$$\frac{0.9\,d_G}{\lambda_G} < \frac{d_x}{\lambda_x} < \frac{1.1\,d_G}{\lambda_G} \quad (5)$$

The equation (4) is provided to optimize the light scattering property and make average phase shifts of incident light by the liquid crystals substantially equal to each other for the individual colors.

The equation (5) is provided to make the relationships between an applied voltage and a light scattering property and the voltage-transmittance characteristics substantially coincide with each other for the individual colors.

Accordingly, where such conditions described are satisfied at a time, a projection type liquid crystal display device can be obtained which is high in brightness and contrast ratio, good in color balance with uniform voltage-transmission characteristic.

An optimized condition is reached if $R_x/\lambda_x$ and $d_x/\lambda_x$ of each of a plurality of liquid crystal display elements are made coincide with $R_G/\lambda_G$ and $d_x/\lambda_G$, respectively.

Accordingly, where three colored light sources of red, green and blue are used, $R_x/\lambda_x$ and $d_x/\lambda_x$ of each of the three liquid crystal display elements are made substantially coincide with $R_G/\lambda_G$ and $d_x/\lambda_G$, respectively. In particular, the following conditions are satisfied.

$$\frac{R_R}{\lambda_R} \approx \frac{R_G}{\lambda_G} \approx \frac{R_B}{\lambda_B} \quad (6)$$

$$\frac{d_R}{\lambda_R} \approx \frac{d_G}{\lambda_G} \approx \frac{d_B}{\lambda_B} \quad (7)$$

In the present invention, it is preferable to optimize $R_x/\lambda_x$ and $d_x/\lambda_x$ for each color as described above. Further, while the contrast ratio is a little deteriorated and the allowable range is decreased, $d_x$ and $\lambda_x$ can be optimized in the following manner with the average particle diameters R of liquid crystals held fixed. In this instance, since the average particle diameter R of liquid crystals need not be varied even for a display in a plurality of dolors, production of a liquid crystal display device is easy. Further, where the liquid crystal display device is used together with color filters, a display in a plurality of colors can be made with the single liquid crystal display element. Accordingly, in order to match the characteristics for the individual colors, $d_x/\lambda_x$ is substantially made equal to $d_G/\lambda_G$ at all of liquid crystal display elements or at the color filters of the liquid crystal display elements. Particularly, the following conditions are satisfied.

$$0.3 < R \cdot \Delta n < 0.7 \quad (1)$$
$$4\,R < d_G < 8\,R \quad (2)$$

$$\frac{0.95\,d_G}{\sqrt{\lambda_G}} < \frac{d_x}{\sqrt{\lambda_x}} < \frac{1.05\,d_G}{\sqrt{\lambda_G}} \quad (5A)$$

The equation (5A) is provided to optimize the light scattering properties by the liquid crystal and make the voltage-transmittance characteristics coincide with each other for the individual colors.

Accordingly, where those conditions are satisfied simultaneously, a display device, particularly a projection type liquid crystal display device, can be obtained which is high in brightness and contrast ratio, good in color balance with uniform voltage-transmission characteristic.

An optimized condition is reached if $d_x/\sqrt{\lambda_x}$ of each of a plurality of liquid crystal display elements or a liquid crystal display element with color filters is made to coincide with $d_G/\sqrt{\lambda_G}$, respectively.

Accordingly, where three colored light sources or color filters of red, green and blue are used, the relationships $d_x$ and $\lambda_x$ of the individual three liquid crystal display elements or the liquid crystal display element with color filters are made to substantially coincide with eath other. In particular, the following condition is satisfied.

$$\frac{d_R}{\sqrt{\lambda_R}} \approx \frac{d_G}{\sqrt{\lambda_G}} \approx \frac{d_B}{\sqrt{\lambda_B}} \quad (7A)$$

For example, where $d_G = 10$ $\mu$m, if $d_R \approx 11$ $\mu$m and $d_B \approx 8$ $\mu$m, then a display which is good in color balance can be obtained while the average particle diameter R of the liquid crystals is maintained fixed.

In the case of three liquid crystal display elements of three colors, the liquid crystal display elements may be produced with the electrode distances individually set in accordance with the conditions described hereinabove, but in the case of a liquid crystal display element with color filters, the electrode distances of picture elements for the individual dolors of the color filters may be varied in accordance with the conditions given hereinabove.

Consequently, a display which is good in color balance and high in contrast ratio can be obtained even if a drive voltage or the like is not adjusted for each color on the driving circuit side.

The absolute value of an electrode substrate distance $d_x$ should be selected in accordance with an applied voltage used such that the display brightness and the contrast ratio may be optimum. When a square wave ranging from 0 to $V_{MAX}$ is applied, the root mean square of applied voltage is equal to the applied voltage, and accordingly, it is preferable to adopt the following range similarly to the equation (3) given hereinabove.

$$0.5 R_G \cdot V_{MAX} < d_G < R_G \cdot V_{MAX} \quad (3A)$$

Particularly, it is preferable for $d_G$ to be smaller than 0.8 $R_G \cdot V_{MAX}$. Where a TFT is used as in an ordinary active matrix liquid crystal display device of the TN type preferably the root mean square of applied voltage is lower than 10 V. For example, in the case of $V_{MAX} = 8$ V, $d_G$ should be substantially 8 to 13 $\mu$m or so.

Liquid crystal used must necessarily have an anisotropy of refractive index $\Delta n$ greater than 0.18. Above all, a value greater than 0.20 is preferable, and particularly a value greater than 0.23 is preferable. Further, the anisotropy of relative dielectric constant $\Delta\epsilon(=\epsilon//-\epsilon\perp)$ is preferably greater than 10 and particularly greater than 13.

While the color balance by a plurality of liquid crystal display elements can be improved to some degree even by modulation of a driving signal, it is difficult to improve the color balance only by modulation of a driving signal on the lower voltage side by a gray scale or when no electric field is applied.

A significant feature of the present invention resides in that voltage-transmittance characteristics for individual colors can be matched with each other, that is, a display which is good in color balance can be obtained, without relying much upon modulatin of a driving signal.

Where a plurality of active matrix liquid crystal display elements each employing a liquid crystal polymer composite which presents a transparent condition when a voltage is applied but presents a scattering condition when no voltage is applied are used and conditioned such that the conditions of the equations (1A), (2A), (4) and (5) given hereinabove may be all satisfied for individual colored light sources therefor, a display which is good in color balance and high in contrast ratio and in brightness can be made using conventional active elements and/or driving integrated circuits of the TN. Particularly, such a display is possible wherein the contrast ratio is greater than 100 and the transmittance when an electric voltage is applied is higher than 70%. Further, since the dynamic range is wide, an element can be obtained wherein a fine gray scale display is possible. Further, where the conditions of the equations (1), (2) and (5A) are all satisfied instead of the conditions given above, such a display wherein the contrast ratio is high and the trasmittance when an electric field is applied is higher than 70% although it is inferior to that of the range described above.

It is to be noted that, in the case of a white and black display, where liquid crystal display elements satisfy all of the conditions of the equations (1) and (2), a bright display having a similarly high contrast ratio can be made.

Further, in order to improve the light scattering property when no electric field is applied, it is effective to increase the voluem fraction $\Phi$ of liquid crystal which can operate in a liquid crystal polymer composite, and $\Phi > 20\%$ is preferable, particularly $\Phi > 35\%$ is preferable for the liquid crystal display element to have a higher diffusing property. However, if $\Phi$ becomes excessively high, the structural stability of a liquid crystal polymer composite is deteriorated, and accordingly, $\Phi < 70\%$ is preferable.

A liquid crystal display element of the present invention presents, when no electric field is applied, a scattering condition (in short, an opaque condition) due to a difference in refractive index between the liquid crystal not in an oriented condition and a polymer matrix. Accordingly, where the liquid crystal display element is used with a projection type display device as in the present invention, light is scattered by a portion of the liquid crystal display element at which no electrode exists, and even if a light shielding layer is not provided at any portion other than pixel, no light comes to a screen from that portion so that portion of the screen looks dark. Consequently, it is not necessary to provide a light shielding layer arround the pixel electrodes in order to prevent leak of light from any other portion of the liquid crystal display element than the pixel electrodes. Accordingly, also there is an advantage that the step of forming a light shielding layer is unnecessary.

A desired electric field is applied to the liquid crystal display element. At portions of the liquid crystal display element to which the electric field is applied, the liquid crystal is oriented so that the ordinary refractive index ($n_o$) of the liquid crystal and the refractive index ($n_p$) of the polymer matrix coincide with each other. Consequently, the liquid crystal display element presents, at the portions thereof, a trasmitting conditon, and accordingly, light is transmitted through the desired pixel to make a bright display thereof on a screen.

If, at a curing step, resin material of the element is caused to cure while a sufficiently high voltage is kept applied only to a particular portion thereof, then the portion is formed into a normally light trasmitting portion. Accordingly, in case there is something to be displayed fixedly, such a normally transmitting portion may be formed on a liquid crystal display element. be mixed into a liquid crystal polymer composite.

Further, a coloring matter, a pigment or the like may be mixed into a liquid crystal polymer composite.

Figure 1:
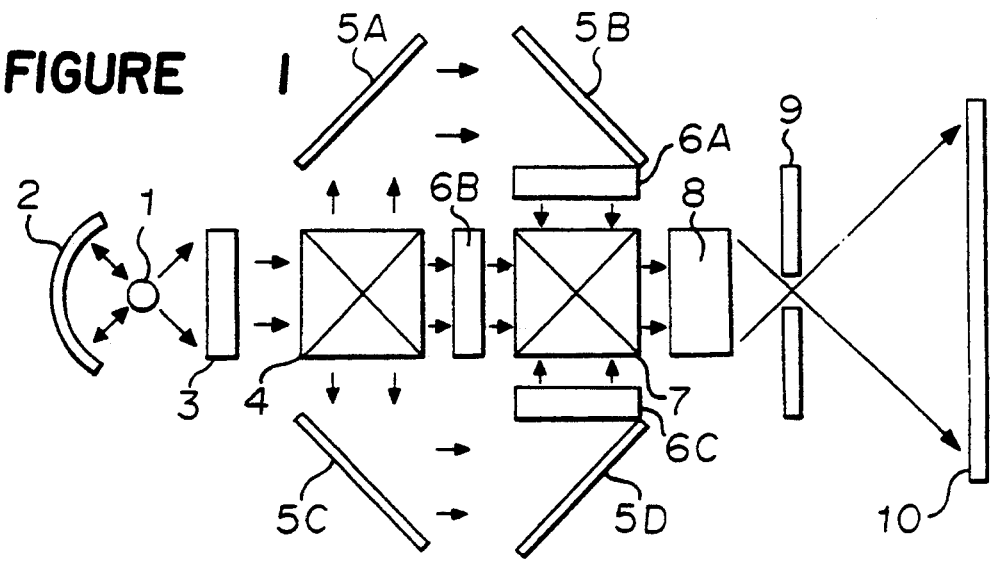
FIG. 1 is a diagrammatic representation showing a full-color projection type active matrix liquid crystal display device according to the present invention which employs a pair of dichloric prisms.

Referring first to FIG. 1, where is shown in diagrammatic representation a full-color projection type active matrix liquid crystal display device which employs a pair of dichroic prisms the full-color projection type active matrix liquid crystal display device includes a colored light source including a light source 1, a concave mirror 2, a condenser lens 3, a dichroic prism 4 for color separation, and four mirrors 5A, 5B, 5C and 5D. The display device further includes three active matrix liquid crystal display elements 6A, 6B and 6C in which liquid crystal polymer composites for different colors are individually held, and an optical system of projection including another dichroic prism 7 for combination, a projecting lens 8 and an aperture member 9 for permitting only rectilinear light to pass therethrough. The display device further includes a projection screen 10.

In the case of a projection display in white and black, optical systems for such color separation and combination are unnecesary. More particularly, a display device may include the light source 1, concave mirror 2, condenser lens 3, active matrix liquid crystal display element 6B in which a liquid crystal polymer composite is held, projecting lens 8, aperture member 9 and screen 10.

Figure 2:
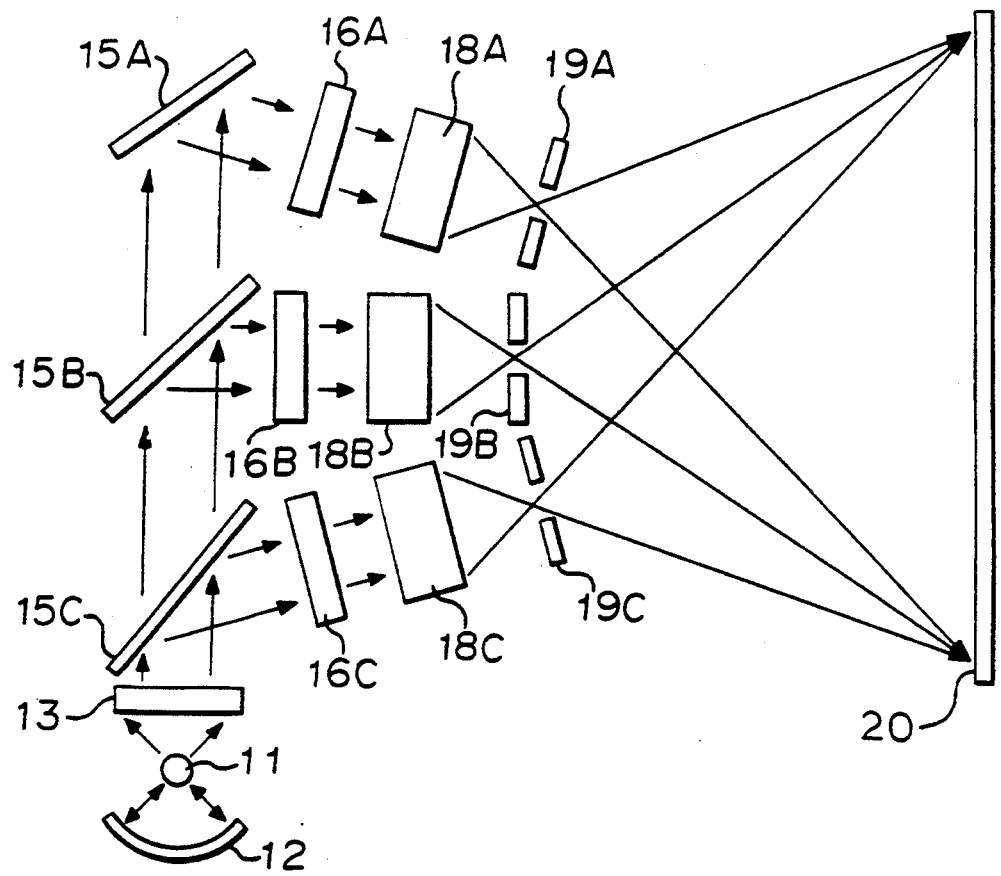
FIG. 2 is a diagrammatic representation showing another full-color projection-type active matrix liquid crystal display device according to the present invention which employ no dichloric prism.

Referring now to FIG. 2, there is shown in diagrammatic representation a full-color projecton type active matrix liquid crystal display device according to the present invention which employs no dichroic prism. The full-color projection type active matrix liquid crystal display device includes a colored light source including a light source 11, a concave mirror 12, a condenser lens 13 and three dichroic mirrors 15A, 15B and 15C. The display device further includes three active matrix liquid crystal display elements 16A, 16B and 16C in which liquid crystal polymer composites for different colors are held, and an optical system of projection including three projecting lens 18A, 18B and 18C provided for the different colors and three aperture members 19A, 19B and 19C provided for the different colors for permitting only rectilinear light to pass therethrough. The display device further includes a projection screen 20.

Figure 3:
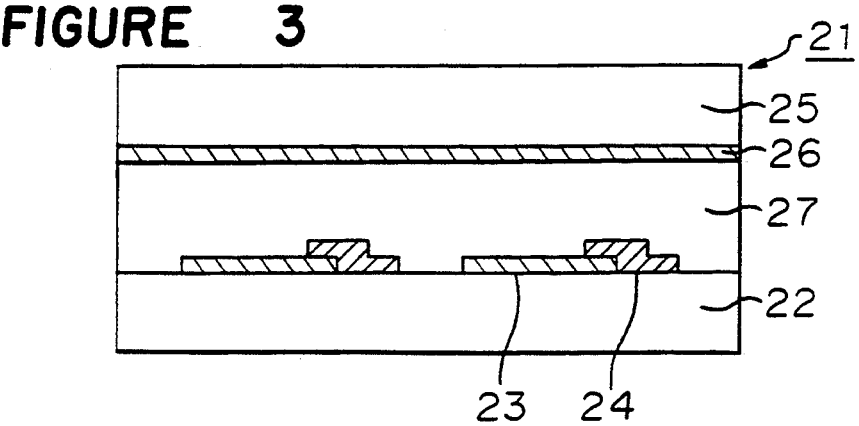
FIG. 3 is a sectional view of an active matrix liquid crystal display element with elecrtrode distances differentiated for different colors for use with a projection type active matrix liquid crystal display device according to the present invention.

Referring now to FIG. 3, there is shown in section an active matrix liquid crystal display element with electrode distances differentiated for different colors for use with a projection type active matrix liquid crystal display device of the present invention. The active matrix liquid crystal dispaly element is generally denoted at 21 and includes a substrate 22 made or glass, plastic or the like and serving as an active matrix substrate, pixel electrodes 23 made of ITO ($In_2O_3$—$SnO_2$), $SnO_2$ or the like, active elements 24 such at transistors, diodes, non-linear resistor elements or the like, another substrate 25 made of glass, plastic or the like and serving as a counter electrode substrate, a counter electrode 26 made of ITO, $SnO_2$ or the like, and a liquid crystal polymer composite 27 held between the substrates 22 and 25.

Figure 4:
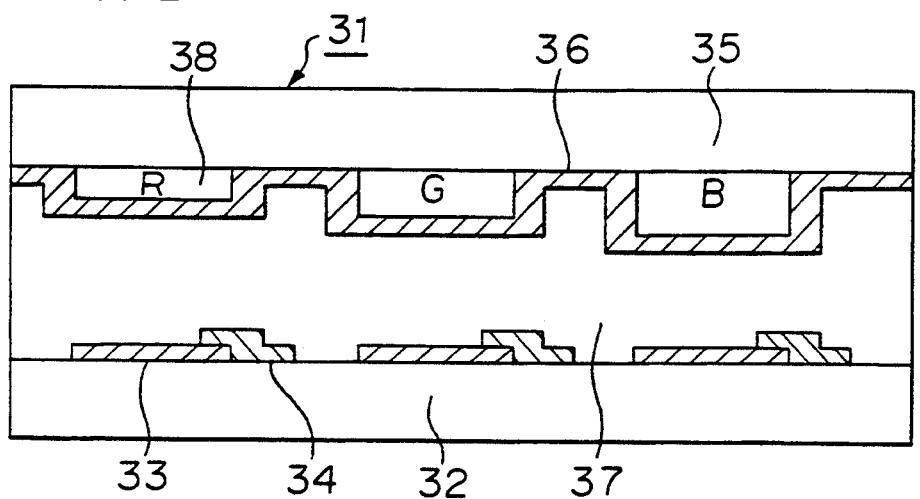
FIG. 4 is a sectional view of an active matrix liquid crystal display element with color filters for use with a projection type active matrix liquid crystal display device according to the present invention.

Referring to FIG. 4, there is shown in section another active matrix liquid crystal display element with color filters for use with a projection type active matrix liquid crystal display device of the present invention. The active matrix liquid crystal display element is generally denoted at 31 and includes a substrate 32 serving as an active matrix substrate, pixel electrodes 33, active elements 34, another substrate 35 serving as a counter electrode substrate, a counter electrode 36, a liquid crystal polymer composite 37, and color filters 38 interposed between the counter electrode 36 and the substrate 35. The distances between the pixel electrodes 33 and the counter electrode 36 are differentiated for different pixels depending upon dominant wavelengths of the color filters 38.

If it is intended to use the liquid crystal display element with color filters to make projection with a single liquid crystal display element, then light from a single projecting light source should be introduced into the liquid crystal display element such that energized light from the liquid crystal display element may be projected on the projection screen by means of the optical system of projection.

Where a three-terminal element such as a thin film transistor (TFT) is used as an active element of an active matrix liquid crystal display element according to the present invention, the counter electrode substrate may be formed as a universal common electrode to all pixels, but where a two-terminal element such as a MIM element or a PIN diode is used, the counter electrode substrate is patterned into stripes.

Meanwhile, where a thin film transistor is used as an active element, silicon is preferably used as a semiconductor material. Particularly since polysilicon has little photosensitivity as distinct from amorphous silicon, it is preferable because it will not casue operation in error even if light from a light source is not interrupted by means of a light shielding layer. Where such polysilicon is used for a projection type liquid crystal display device as in the present embodiment, an intense projecting light source can be utilized and a bright display can be obtained.

On the other hand, in the case of a conventional liquid crystal display element of the TN type, a light shielding layer is formed in most cases between adjacent pixels in order to prevent leakage of light from between the pixels. Upon formation of such light shielding layers, light shielding layers can be formed simultaneously at locations of active elements, and accordingly, formation of light shielding layers at locations of active elements does not have a great influence on the entire process. In other words, even if polysilicon is used for active elements and light shielding layers are not formed at locations of the active elements, if there is the necessity of formation of light shielding layers between pixels, no step can be eliminated.

However, according to the present invention, since a liquid crystal polymer composite is used wherein the refractive index of a polymer matrix substantially Coincides with the ordinary refractive index ($n_o$) of liquid crystal used as described above, light will scattered at a location of the liquid crystal display element to which no electric field is applied so that a dark area will be formed at a corresponding location of a projection screen. Accordingly, no light shielding layer need be formed between adjacent pixels. Thus, since no light shielding layer need be formed at locations of active elements where polysilicon is used for such active elements, a step of forming a light shielding layer can be eliminated, and the number of steps can be reduced and the productivity is improved.

Further, while the electrodes are normally formed as transparent electrodes, where the liquid crystal display device is used as of the reflection type, the electrodes may be reflective electrodes made of chrome, nickel or the like.

A liquid crystal display element and a liquid crystal display device of the present invention may be further provided with an infrared ray cut filter, an ultraviolet ray cut filter or the like layered thereon or with a print of characters, figures or the like or may include a plurality of liquid crystal display elements.

According to the present invention, where a light curable polymer is employed as a non-cured polymer for constituting an aforementioned liquid crystal polymer composite, preferably a light curable vinyl polymer is used.

In particular, a light curable acrylic polymer is listed as an example, and particularly a light curable acrylic polymer is used preferably which contains acrylic oligomer that polymerizes and cures by irradiation of light thereupon.

Liquid crystal which is used in the present embodiment is nematic liquid crystal which has a positive dielectric anisotropy and wherein the refractive index of a polymer matrix coincides with the ordinary refractive index ($n_o$) of the liquid crystal. While liquid crystal may be used alone or a mixture may be used, it is advantageous to use a mixture in order to meet various required performances such as an operating temperature range and an operating voltage.

Further, where a light curable polymer is used, liquid crystal used for a liquid crystal polymer composite preferably contains light curable polymer dissolved uniformly therein, and cured substance after exposure to light will not or little be dissolved. However, where a composition is used, liquid crystals of individual components desirably have solubilities as close as possible to each other.

A liquid crystal polymer composite may be produced in the following manner. In particular, non-cured mixture liquid for a liquid crystal polymer composite is filled by way of a filling port into a spacing between an active matrix substrate and a counter electrode substrate which are disposed such that electrodes thereon may opposed to each other as in a conventional ordinary liquid crystal display element, and the circumference of the spacing is sealed with a seal material whereafter the filling port is closed. Or else, a mixture of a curable compound and liquid crystal may be supplied onto a substrate whereafter a counter substrate is placed on the mixture on the substrate.

A liquid crystal display element of the present invention may be composed of liquid crystal to which a dichroic compound or a coloring material or pigment is added or else composed of liquid crystal in which a colored curable compound is contained.

According to the present inveiton, as a liquid crystal polymer composite employs liquid crystal as a solvent and a light curable polymer is caused to cure by exposure thereof to light, there is no necessity of evaporation of mere solvent or water which becomes unnecessary upon curing. Consequently, the light curable resin can be cured in an enclosed system, and accordingly, a conventional process of production of filling liquid crystal into a cell can be adopted as it is and the reliability is high. Besides, since there is an effect that two substrates are adhered to each other by means of such light curable polymer, the reliability is further improved.

As a liquid crystal polymer composite is employed in this manner, a liquid crystal-display element wherein the possiblility that upper and lower transparent electrodes may be short-circuited is reduced and a transmission condition and a scattering condition can be controlled without the necessity of strictly controlling an orientation or a substrate distance as in an ordinary display element of the TN type can be produced with a very high poductivity.

A liquid crystal display device of the present invention should be driven such that, when a voltage is to be applied for driving thereof, a voltage lower than the maximum root means square of applied voltage provided by the expression (3) or (3A) given hereinabove, normally such maximum root mean square of applied voltage, may be applied to the liquid crystal polymer composite between electrodes of a pixel.

A conventional light source, optical system of projection and projection screen can be used as the light source, optical system of projection and projection screen, respectively, in the present invention, and an active matrix liquid crystal display element of the present invention should be interposed between a colored light source and the optical system of projection. In this instance, the optical system of projection may be constituted such that images of a plurality of active matrix liquid crystal display elements are combined for projection thereof by means of an optical system as shown in FIG. 1 or else images of a plurality of active matrix liquid crystal display elements are projected on a projection screen so as to combine them on the projection screen as shown in FIG. 2.

Further, while colored light sources are also obtained by color separation of light from a single light source in the example described hereinabove, otherwise a plurality of colored light sources may be individually provided in advance so that rays of light therefrom may be individually introduced into active matrix liquid crystal display elements.

The light source which may be used as such a colored light source may be a halogen lamp, a metal halide lamp, a xenon lamp or the like, and a concave mirror, a condensor lens or the like may be combined to use light efficiently.

Further, a cooling system may be added, or an infrared ray cut filter or an ultraviolet ray cut filter may be used in combination, or else a channel display or the like such as a light emitting diode or the like may be additionally provided.

Particularly where a display of the projection type is made, the display contrast can be increased by disposing on a passage of light a device for reducing diffused light such as, for example, the aperture or spot member as represented by 9, 19A, 19B or 19C in FIGS. 1 or 2.

In particular, in order to improve the contrast ratio, it is preferable to employ, as a device for reducing diffused light, a device which takes out, from among beams of light which have passed through a liquid display element, those beams of light which advance rectilinearly with respect to incident beams of light (beams of light which have passed through pixel portions in a trasmitting condition) but reduce beams of light which do not advance rectilinearly (light diffused at portions of a liquid crystal polymer composite which are in a scattering condition).

It is particularly preferable for the device not to reduce light which advances rectilinearly but to reduce diffused light which does not advance rectilinearly. More particuraly, a plate having an opening formed at a central portion thereof may be disposed at a location to which light is condensed by a lens or the like. Thus, light which advances rectilinearly passes through the opening of the plate and is not reduced by the plate, but diffused light which does not advance rectilinearly comes at a portion of the plate around the opening and does not reach a projection screen. Consequently, the contrast of an image projected is improved.

Such a device for reducing diffused light may be interposed between an optical system of projection and a projection screen as shown in FIGS. 1 or 2 or may be interposed in an optical system of projection, for example, where an optical system of projection is composed of a plurality of lenses, between two adjacent ones of the lenses of the optical system of projection.

The device for reducing diffused light is not limited to such an aperture or spot member as described hereinabove, but may be, for example, a mirror of a small area disposed on a passage of light.

The ratio between a rectilinearly advancing light component which reaches a projection screen and a scattered light component can be controlled in accordance with the diameter of a spot or a mirror and the focal length of a lens and may be Set to a suitable value so that a desired display contrast and display brightness may be obtained.

Such device for reducing diffused light transmits light of $\delta < \delta_o$ therethrough and interrupts light of $\delta 22 \delta_o$ where $\delta$ is a scattering angle of light with respect to rectilinearly advancing light. As the angle $\delta_o$ is reduced, the diffused light is reduced and the contrast ratio is increased, but there is the tendency that the brightness is decreased. On the contrary, as the angle $\delta_o$ is increased, the brightness is increased, but the contrast ratio is decreased. Therefore, $\delta_o$ should preferably be 0.2 to 5 degrees or so, and particularly preferably be 0.5 to 3 degrees.

A projection type active matrix liquid crystal display device of the present invention may be constructed as the front projection type (wherein the device and an observer are positioned on the same side with respect to a projection screen) or else as the rear projection type (wherein the device and an observer are positioned on the opposite sides with respect to a projection screen).

Thus, according to the present invention, a projection type display which is good in color balance, high in display brightness and high in contrast ratio can be attained.

Particularly, according to the present invention, since such an active matrix liquid crystal display element wherein a liquid crystal polymer composite of a specific characteristic corresponding to a color of a light source as described above is employed a good color balance and gray scale can be attained without incorporating a special correcting circuit in a drive cicuit. Further, the maximum root mean square of applied voltage can be decreased to a voltage lower than 10 volts, and accordingly, such active elements or driving integrated circuits as used in a conventional active matrix liquid crystal display element of the TN type can be used readily.

In the following, the present invention will be described more in detail in connection with various examples.

EXAMPLE 1

Chrome was evaporated to a thickness of 60 nm on a glass substrate ("7059" Substrate by Corning), and the article was patterned to form gate electrodes thereon. Subsequently, a silicon oxynitride film and an amorphous silicon film were deposited by means of a plasma CVD device. Then, the amorphous silicon film was annealed using a laser and then patterned to make polysilicon. Phosphorus doped amorphous silicon and chrome were then deposited on the polysilicon using the plasma CVD device and an evaporating device and were then patterned in such a manner as to cover the polysilicon to make source electrodes and drain electrodes for the first layer. Further, ITO was evaporated, and then the article was patterned to form pixel electrodes. Subsequently, chrome and aluminum were successively evaporated on the source electrodes and drain electrodes for the first layer, and the article was patterned to make source electrodes and drain electrodes for the second layer. After that, a silicon oxynitride film was deposited to form a protective film by means of the plasma CVD device, thereby completing an active matrix substrate.

A counter electrode substrate formed as a substrate of the same glass material having an ITO electrode formed on the entire surface thereof and the active matrix substrate produced in such a manner as described above were disposed such that the electrodes thereof might be opposed to each other, and a spacer having a diameter of about 11.0 $\mu$m was sprayed into a spacing between the substrates whereafter the circumference of the substrates was sealed with seal material of the epoxy family except a location of a filling port to produce an empty cell having a substrate distance $d_G$ of about 11.0 $\mu$m.

Six parts of 2-ethyl hexyl acrylate, 18 parts of hydroxyethyl acrylate, 14 parts of acrylic oligomer ("M1200" by Toa Gosei Kagaku), 0.4 parts of "Dalocure 1116" by MERCK as a light curing initiating agent, and 62 parts of liquid crystal "E-8" by BDH were dissolved uniformly.

The mixture was filled into the empty cell produced by the process described above by way of the filling port, and then the filling port was closed.

An ultraviolet ray was irradiated upon the cell for 60 seconds to cause the liquid crystal polymer composite to produce an active matrix liquid crystal display element for display of green.

The average particle diameter $R_G$ of the liquid crystal in the liquid crystal polymer composite of the liquid crystal display element thus produced was about 1.9 $\mu$m, the anisotropy of refractive index $\Delta n$ of the liquid crystal was about 0.24, and the dielectric anisotropy $\Delta \epsilon$ was about 15.6.

Another active matrix liquid crystal display element for display of red was produced in a similar manner. The average particle diameter $R_R$ of liquid crystal of the active matrix liquid crystal display element was about 2.4 $\mu$m, and the substrate distance $d_R$ was about 12.5 $\mu$m.

A further active matrix liquid crystal display element for display of blue was produced in a similar manner. The average particle diameter $R_B$ of liquid crystal of the active matrix liquid crystal display element was about 1.5 $\mu$m, and the substrate distance $d_B$ was about 9.0 $\mu$m.

Figure 5:
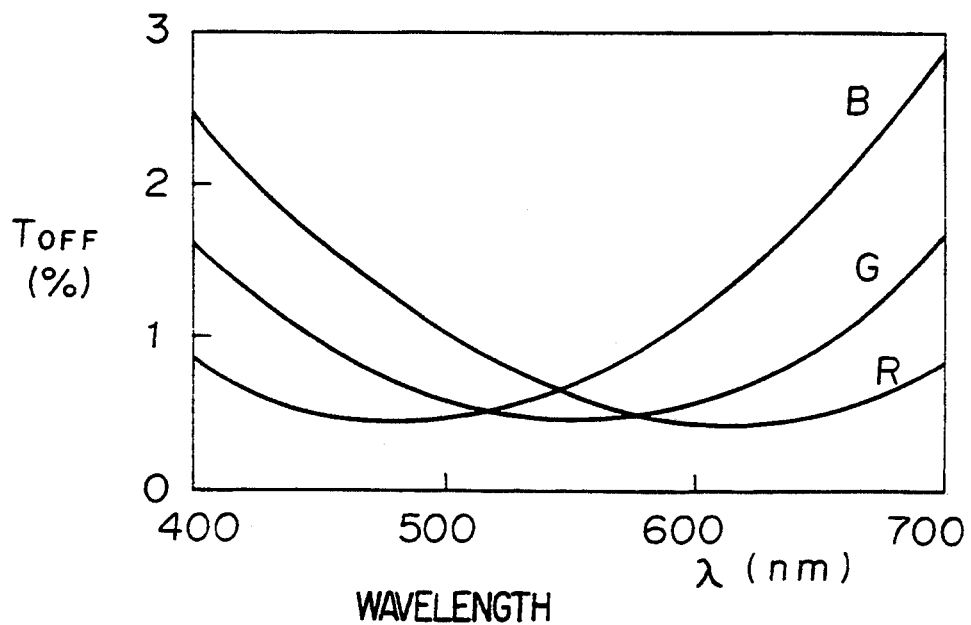
FIG. 5 is a graph showing wavelength characteristics of the transmittance of a liquid crystal display element produced in accordance with the present invention.

Wavelength characteristics in transmittance $T_{OFF}$ of the liquid crystal display elements when no electric field was applied are individually such as shown in FIG. 5. As seen in FIG. 5, a high scattering performance, that is, a low $T_{OFF}$, is exhibited in or around a waveform range of 570 to 670 nm in the case of the liquid crystal display element for red (indicated by R in FIG. 5), in or around another waveform range of 490 to 580 nm in the case of the liquid crystal display element for green (G), and in or around a further wavelength range of 420 to 520 nm in the case of the liquid crystal display element for blue (B).

A projection type display device having such a construction as shown in FIG. 1 was constructed using three such liquid crystal display elements, and a video signal was inputted to a drive circuit to drive the display device such that a voltage to be applied to the liquid crystal polymer composites of the liquid crystal display elements might be 8 volts in root mean square value so as to project a projection image on a projection screen.

As a result, a full-color picture image of animation display free from an after-image was obtained, and a bright display wherein a color balance was substantially attained at each gray scale and the contrast ratio on the projection screen was higher than 100 was obtained.

It is to be noted that the contrast ratio of an image projected on the projection screen was about 60 when no aperture member was used as a device for reducing diffused light.

Comparative Example 1

The liquid crystal display elements for green of Example 1 above were prepared and combined with three colored light sources of red, green and blue to construct a projection type display device similar to that of Example 1.

A display obtained on the projection type display device was a generally reddish picture image, and this tendency was remarkable at a lower voltage level. Further, when no electric field was applied to the three liquid crystal display elements, the projection screen exhibited not a dark condition but a dark red condition.

It is considered that this was caused by the fact that the threshold voltage characteristics of the liquid crystals are different for red, green and blue, and examination of applied voltage-transmittance characteristics for red, green and blue revealed that, at a middle voltage level, the transmittance was highest with red and lowest with blue at the same applied voltage.

Comparative Example 2

Three liquid crystal display elements were produced wherein the substrate distance $d_R$, $d_G$ and $d_B$ thereof were the same as those in Example 1 above but only the average particle diameters $R_R$, $R_G$ and $R_B$ of the liquid crystals were changed to about 3.6 μm for red, about 2.9 μm for green and about 2.3 μm for blue. The liquid crystal display elements were combined with three colored light sources of red, green and blue to construct a projection type display device similar to that of Example 1.

A display obtained in the pojection type display device was bright, but the contrast ratio thereof was a low value of about 10.

EXAMPLE 2

A projection type display device having such a construction as shown in FIG. 2 was constructed using the same liquid crystal display elements as in Example 1 above. The projection type display device also presented a display which is good in color balance and high in brightness and also in contrast ratio similarly to that of Example 1.

EXAMPLE 3

An active matrix liquid crystal display element wherein d was about 11 μm, the average particle diameter R of liquid crystal was about 2.0 μm, the anisotropy of refractive index Δn of the liquid crystal was about 0.24 and the dielectric anisotropy Δε was about 15.6 was produced in a similar manner as in Example 1 above.

The element was driven using a conventional driving integrated circuit for a liquid crystal display element of the TN type such that the voltage to be applied to the liquid crystal polymer composite may be 7 volts in root mean square value. As a result, the rectilinear light transmittance was about 80% upon application of 7 volts and about 0.5% upon application of 0 volt, and a display wherein the contrast ratio was about 160 was obtained when the element was driven with 7 volts. Further, when the element was driven with a video signal, a black and white animation display was obtained which had a gray scale but was free from an after-image.

A projection light source and an optical system of projection were combined with the liquid crystal display element to make a projection type liquid crystal display device. When the liquid crystal display device was driven such that the voltage to be applied to the liquid crystal polymer composite might be 7 volts in root mean square value in a similar manner as described hereinabove, a bright display having a high contrast ratio was obtained in a projection screen.

The contrast ratio of an image projected on the projection screen was about 60 when no device for reducing diffused light was used. However, when a spot member was used as a device for reducing diffused light, the contrast ratio was about 120.

Further, when the liquid crystal display device was driven with a video signal, an animation display of a large screen greater than 50 inches was possible.

Comparative Example 3

Ordinary nematic liquid crystal was filled in place of the liquid crystal polymer composite of Example 3 above to produce an active matrix liquid crystal display element in the form of a liquid crystal display element of the TN type.

The projection light source and optical system of projection of Example 3 was combined with the liquid crystal display element to make a projection type liquid crystal display device, which was then driven in a similar manner as in Example 3. As a result, only a display was obtained wherein the brightness on the projection screen was about one third that of Example 3 and the contrast ratio was low of about 20.

EXAMPLES 4 AND 5

Comparative Examples 4 to 8

Various active matrix liquid crystal display elements were produced in a substantially similar manner as in Example 1 above but varying the average particle diameter R of liquid crystal and the substrate distance d.

Transmittances $T_{7V}$ of the liquid crystal display elements with respect to white light upon application of a voltage of 7 volts, contrast ratios $CR_D$ of the liquid crystal display elements themselves depending upon their rectilinear light transmittances, and contrast ratios $CR_P$ upon projection to a projection screen when such a spot member as shown in FIG. 2 was used as a device for reducing diffused light, were measured.

Results are shown in Table 1 below.

TABLE 1

| Example No. | R μm | d μm | $T_{7V}$ % | Contrast Ratio $CR_D$ | Contrast Ratio $CR_P$ |
| --- | --- | --- | --- | --- | --- |
| Comparative Example 4 | 1.0 | 11.0 | 25 | 70 | 50 |
| Comparative Example 5 | 1.5 | 11.0 | 45 | 90 | 60 |
| Example 3 | 2.0 | 11.0 | 80 | 160 | 120 |
| Comparative Example 6 | 3.5 | 11.0 | 82 | 15 | 10 |
| Comparative Example 7 | 2.0 | 5.0 | 83 | 10 | 7 |
| Comparative Example 8 | 2.0 | 20.0 | 15 | 50 | 30 |
| Example 4 | 1.5 | 8.0 | 82 | 140 | 100 |
| Example 5 | 2.5 | 13.0 | 78 | 100 | 70 |

EXAMPLE 6

When the liquid crystal display element of Comparative Example 5 was driven with 10 volts, $T_{10V}$ was about 77% $CR_D$ was about 150, and $CR_P$ was about 110.

EXAMPLE 7

An active matrix liquid crystal display element for display of green was produced in a similar manner as in Example 1. The average particle diameter R of liquid crystal in a liquid crystal polymer composite of the liquid crystal display element for display of green was about 1.9 μm, the anisotropy of refractive index Δn of the liquid crystal was about 0.24, the dielectric anisotropy Δε was about 15.6 and the substrate distance $d_G$ was about 11.0 μm.

Further active matrix liquid crystal display elements for display of red (the average particle diameter R of liquid crystal was about 1.9 μm and the substrate distance $d_R$ was about 12.0 μm) and for display of blue (the average particle diameter R of liquid crystal was about 1.9 μm and the substrate distance $d_B$ was about 10.0 μm) were produced in a similar manner.

Voltage-transmittance Characteristics of the liquid crystal display elements were measured for individual colors. The measurements revealed that the characteristic are substantially same with each other.

A projection type display device having such a construction as shown in FIG. 1 was constructed using the three liquid crystal display elements, and a video signal was inputted to a drive circuit to drive the projection type display device such that the voltage to be applied to the liquid crystal polymer composite might be 8 volts in root mean square value to project a projection image on a projection screen.

As a result, a full-color picture image of animation display free from an after-image was obtain and a bright display wherein a color balance was substantially attained at each gray scale and the contrast ratio on the projection screen higher than 80 was obtained.

It is to be noted that the contrast ratio of an image projected on the projection screen was about 40 when no aperture member was used as a device for reducing diffused light.

Comparative Example 9

Three liquid crystal display elements for green of Example 7 above were prepared and combined with three colored light source of red, green and blue to construct a projection type display device similar to that of Example 7.

A display obtained in the projection type display device was a generally reddish picture image, and this tendency was remarkable at a lower voltage level. Further, when no electric field was applied to the three liquid crystal display elements, the projection screen exhibited not a dark condition but a dark red condition. It is considered that this was caused by the fact that the threshold voltage characteristics of the liquid crystals are different for red, green and blue, and examination of applied voltage-transmittance characteristics for red, green and blue revealed that, at a middle voltage level, the transmittance was highest with red and lowest with blue at the same applied voltage.

Comparative Example 10

Three liquid crystal display elements were produced wherein the substrate distances $d_R$, $d_G$ and $d_B$ thereof were the same as those in Example 1 above but the average particle diameters R of the liquid crystals were changed to 3.0 μm. The liquid crystal display elements were combined with three colored light sources of red, green and blue to construct a projection type display device similar to that of Example 7.

A display obtained on the projection type display device was bright, but the contrast ratio thereof was a low value of about 10.

EXAMPLE 8

A projection type display device having such a construction as shown in FIG. 2 was constructed using the same liquid crystal display elements as in Example 7 above. The projection type display device also presented a display which is good in color balance and high in brightness and also in contrast similarly to that of Example 7.

EXAMPLE 9

Three color filters of red, green and blue were formed on the counter electrode substrate of Example 1 above, and a counter electrode of ITO was formed over the color filters. In this instance, the color filters were differentiated in thickness such that, when they were combined with an active matrix substrate, the electrode distance might be 12.0 μm at a location of a red pixel, 11.0 μm at a location of a green pixel and 10.0 μm at a location of a blue pixel. It is to be noted the average particle diameter R of the liquid crystals was 1.9 μm and substantially uniform.

A video signal was inputted to dirve circuits of the liquid crystal display elements such that the voltage to be applied to the liquid crystal polymer composite might be 8 volts in root mean square value. As a result, a bright display which is good in color balance was obtained.

The liquid crystal display elements are combined with a white light source, an optical system of projection and an aperture member to construct a projection type display device, and a projection image was projected on a projection screen from the projection type display device. As a result, a display which is high in brightness and contrast ratio and good in color balance was obtained.

EXAMPLE 10

Three active matrix liquid crystal display elements were prepared in the same manner as Example 1 except that thin film transistors having inverse-stagger type amorphous silicon are used, light to the side of the substrate is interrupted by the gate electrodes and light to the side of the liquid crystal is interrupted by a light shielding layer through an insulating film.

A projection type display device was constructed using thus prepared liquid crystal elements, and a display which is the same as that of Example 1 was obtained. In the liquid crystal display elements of this Example, however, an additional step of forming the light shielding layer was necessary. Further, the display was adversely influenced when there was a fault in the light shielding layer.

As apparent from the foregoing description, an active matrix liquid crystal display element is good in color balance of a display thereof, and driving thereof is facilitated because a driving wave form need not be corrected for each color on the driving circuit side.

In a projection type active matrix liquid crystal display device of the present invention, since a liquid crystal display element is used wherein a liquid crystal material to be held between an active matrix substrate and a counter electrode substrate is a liquid crystal polymer composite which can be electrically controlled between a scattering condition and a transmitting condition, no polarizing plate is required, and the transmittance of light upon transmission can be improved significantly and accordingly a bright projection picture image can be obtained.

The liquid crystal display element of the present invention has a high light scattering property when no electric field is applied thereto but has a high transmittance when an electric field is applied by way of an active element. Even if it is driven by means of a conventional driving integrated circuit for a liquid crystal display element of the TN type, it still presents a high contrast ratio and provides a display of a high brightness.

Further, according to the present invention, since characteristics of liquid crystal display elements are optimized for individual colors of colored light sources, a display having a good color balance can be obtained also at a gray scale. Particularly, where both of the average particle diameters R of liquid crystal and the electrode distances d are optimized with the dominant Wave length λ, a display can be obtained which is high in contrast ratio and good in color balance. Further, while the contrast ratio is deteriorated and the allowable range is decreased comparing with the case just described, it is also possible to optimize only the electrode distance d with the dominant wave length λ. In this instance, since the average particle diameters R of the liquid crystals may be equal to each other, there are advantages that the productivity is high, that a full color display can be made by means of a single liquid crystal display element where it is combined with color filters, and so forth.

Further, since no polarizer need be employed, also there is an advantage that the wavelength dependence of optical characteristics is low, and accordingly, color correction for a light source or the like is little required.

Moreover, since possible problems of destruction of active elements or the like upon an orientation processing such as rubbing necessary for a liquid crystal display element of the TN type or by static electricity generated inadvertently can be avoided, the yield in production of liquid crystal display elements can be improved significantly. Further, since the liquid crystal polymer composite presents the form of a film after curing thereof, such problems as short-circuiting between substrates by pressure thereupon and destruction of active elements by displacement of a spacer do not take place readily.

Further, the liquid crystal polymer composite is similar in specific resistance to that in the conventional TN mode, and a great storage capacitor need not be provided for each pixel element as in the DS mode. Consequently, designing of active elements can be facilitated and the ratio of an effective pixel electrode area can be increased readily, and besides power consumption of liquid crystal display elements can be restricted to a low level.

Further, since liquid crystal display elements can be produced only by eliminating an orientation film forming step from a conventional process of production of liquid crystal display elements of the TN mode, production of them can be made readily.

Meanwhile, the liquid crystal display element which employs the liquid crystal polymer composite has a feature that the response time is short, and a display of an animation can be made readily. Further, since the electro-optical characteristics (voltage-transmittance dependence) of the liquid crystal display element is looser than a conventional liquid crystal display element of the TN mode, it can be readily applied to display gray scale.

In addition, since, in the liquid crystal display element of the present invention, light is scattered by a portion thereof to which no electric filed is applied, even if a light shielding layer for interrupting light is not provided at any portion other than pixels, there is no leak of light upon projection of light, and accordingly, there is no necessity of provision of light shielding means between adjacent pixels. Consequently, where an active element made of polysilicon is used as an active element, a projection light source of a high brightness can be used without provision of light shielding layers at active element portions of the liquid crystal display element. Accordingly, a projection type liquid crystal display device of a high brightness can be used readily. In addition, no light shielding layer need be provided in this instance, and accordingly, the process of production can be further simplified.

Having now fully described the invention, it will be apparent to one of ordinary skill in the art that many changes and modifications can be made thereto without departing from the spirit and scope of the invention as set forth herein.

What is claimed is:

1. An active matrix type liquid crystal display element wherein liquid crystal polymer composite in which a nematic liquid crystal is dispersed and held in a polymer matrix having a refractive index which is substantially equal to an ordinary refractive index ($n_0$) of the liquid crystal is held between a first substrate on which at least a pixel electrode with an active element is provided and a second substrate on which at least a counter electrode is provided, wherein said polymer matrix is made of a light curable type polymer, said liquid crystal polymer composite layer is obtained by irradiating light to the solution in which the liquid crystal and the light curable type polymer are dissolved uniformly to cause the solution to cure, a specific resistance of said liquid crystal polymer composite is higher than $5 \times 10^9$ Ωcm, an average particle diameter $R(\mu m)$ of the liquid crystal dispersively contained in the polymer matrix is substantially uniform and is 1.5 to 2.5 $\mu m$, an electrode substrate distance $d_0$ is substantially 8 to 13 $\mu m$, and a maximum root mean square of applied voltage for said liquid crystal polymer composite is lower than or equal to 10 volts.

2. An active matrix type liquid crystal display element as set forth in claim 1, wherein said polymer is a light curable vinyl polymer.

3. An active matrix type liquid crystal display element as set forth in claim 1, wherein the light irradiating for the solution is ultraviolet ray.

4. An active matrix type liquid crystal display element as set forth in claim 1, wherein said active element is a polysilicon thin film transistor.

5. An active matrix type liquid crystal display element as set forth in claim 1, wherein said active element is a MIM element.

6. An active matrix type liquid crystal display element as set forth in claim 1, wherein said active element is a PIN diode.

7. An active matrix type liquid crystal display element as set forth in claim 1, wherein said electrode is a reflective electrode and used as of the reflection type liquid crystal display element.

8. An active matrix type liquid crystal display element as set forth in claim 1, further comprising:
   color filters to combine with the liquid crystal display element to make a color display.

9. A projection type active matrix type liquid crystal display element comprising:
   a liquid crystal display element having a liquid crystal polymer composite in which a nematic liquid crystal is dispersed and held in a polymer matrix having a refractive index which is substantially equal to an ordinary refractive index ($n_0$) of the liquid crystal is held between a first substrate on which at least a pixel electrode with an active element is provided and a second substrate on which at least a counter electrode is provided, wherein said polymer matrix is made of a light curable type polymer, said liquid crystal polymer composite layer is obtained by irradiating light to the solution in which the liquid crystal and the light curable type polymer are dissolved uniformly to cause the solution to cure, a specific resistance of said liquid crystal polymer composite is higher than $5 \times 10^9$ $\Omega$cm, an average particle diameter $R(\mu m)$ of the liquid crystal dispersively contained in the polymer matrix is substantially uniform and is 1.5 to 2.5 $\mu$m, an electrode substrate distance $d_0$ is substantially 8 to 13 $\mu$m, and a maximum root mean square of applied voltage for said liquid crystal polymer composite is lower than or equal to 10 volts.

10. A projection type active matrix type liquid crystal display device as set forth in claim 9, further comprising:
   a projection light source for projecting light onto said liquid crystal display element;
   an optical system of projection for projecting an image from said liquid crystal display element; and
   a device for reducing diffused light located in the optical system of projection or between the optical system of projection and a projection screen.

11. A projection type active matrix type liquid crystal display device as set forth in claim 9, further comprising:
   a projection light source for projecting light onto said liquid crystal display element;
   an optical system of projection for projecting an image from said liquid crystal display element; and
   a device for reducing diffused light located in the optical system of projection or between the optical system of projection and a projection screen, wherein said device for reducing diffused light is an aperture or a spot disposed on a passage of light.

12. A projection type active matrix type liquid crystal display device as set forth in claim 9, further comprising:
   a projection light source for projecting light onto said liquid crystal display element;
   an optical system of projection for projecting an image from said liquid crystal display element; and
   a device for reducing diffused light located in the optical system of projection or between the optical system of projection and a projection screen wherein the device for reducing diffused light is a mirror having a small surface area which is disposed on a passage of light.

13. A projection type active matrix type liquid crystal display device as set forth in claim 9, further comprising:
   a projection light source for projecting light onto said liquid crystal display element;
   an optical system of projection for projecting an image from said liquid crystal display element; and
   a device for reducing diffused light located in the optical system of projection or between the optical system of projection and a projection screen, the projection screen further comprising:
   means for separating light from the projection light source into lights of three colors of R, G and B;
   means for passing the light of three colors through respective active matrix liquid crystal display elements; and
   means for synthesizing light emitted from the liquid crystal display elements to project them through the optical system of projection.

* * * * *